United States Patent [19]

Garrison

[11] Patent Number: 5,516,014
[45] Date of Patent: *May 14, 1996

[54] ARTICLE GRIPPING MEANS AND METHOD OF MAKING SAME

[75] Inventor: Judd Garrison, Grand Rapids, Mich.

[73] Assignee: Batts, Inc., Zeeland, Mich.

[ * ] Notice: The term of this patent shall not extend beyond the expiration date of Pat. No. 5,020,705.

[21] Appl. No.: 72,358

[22] Filed: Jun. 3, 1993

Related U.S. Application Data

[62] Division of Ser. No. 854,326, Mar. 19, 1992, which is a continuation of Ser. No. 679,436, Apr. 2, 1991, abandoned, which is a division of Ser. No. 389,947, Aug. 7, 1989, Pat. No. 5,020,705.

[51] Int. Cl.$^6$ .................................................. A47G 25/48
[52] U.S. Cl. ................................ 223/96; 223/93; 223/91; D6/326
[58] Field of Search ........................ 223/85, 88, 90, 223/95, 96, 91, 93; 211/124; 248/339; D6/315, 323, 326; 425/130

[56] References Cited

U.S. PATENT DOCUMENTS

| | | | |
|---|---|---|---|
| 1,205,551 | 11/1916 | Leach | 223/85 |
| 2,212,978 | 8/1940 | Deknatel | 223/96 |
| 2,463,136 | 3/1949 | Baer, Sr. | 223/90 |
| 2,535,521 | 12/1950 | Schoepfer | 223/96 |
| 2,920,801 | 1/1960 | Batts | 223/96 |
| 3,102,668 | 9/1963 | Milligan | 223/95 |
| 3,767,092 | 10/1973 | Garrison et al. | 223/96 |
| 4,373,113 | 2/1983 | Winkler et al. | 174/179 |
| 4,385,025 | 5/1983 | Salerno et al. | 264/255 |
| 4,840,760 | 6/1989 | Oishi | 264/255 |
| 5,022,571 | 6/1991 | Blanchard | 223/95 |

OTHER PUBLICATIONS

Kraton Thermoplastic Rubber, Typical Properties 1987; Shell Oil Company: Woodstock, IL.

*Primary Examiner*—C. D. Crowder
*Assistant Examiner*—Bibhu Mohanty
*Attorney, Agent, or Firm*—Baker & McKenzie

[57] ABSTRACT

A method of manufacturing a molded plastic garment hanger having a pair of hingedly connected jaws is provided. The jaws include a thin pad of resilient thermoplastic rubber molded to the inner surface of one or both of the garment-gripping jaws. The pad is formed by injection molding during the molding cycle which forms the hanger body itself with a short dwell period between the injection of the resin forming the hanger body and the injection of the thermoplastic rubber forming the pad so that the pad and body become fused together at the boundary between them.

4 Claims, 2 Drawing Sheets

ARTICLE GRIPPING MEANS AND METHOD OF MAKING SAME

CROSS REFERENCE TO RELATED APPLICATION

This is a division of application Ser. No. 07/854,326, filed Mar. 19, 1992, which is a continuation of Ser. No. 07/679,436, filed on Apr. 2, 1991, abandoned, which is a division of application Ser. No. 07/389,947 filed Aug. 7, 1989 which issued as U.S. Pat. No. 5,020,705 on Jun. 4, 1991.

FIELD OF THE INVENTION

A garment clamping hanger is disclosed which has garment gripping pads molded of a synthetic rubber under circumstances such that a particularly strong bond is created between the pad and the hanger.

BACKGROUND OF THE INVENTION

Garment clamping hangers have been used for many years. An example of such a hanger is the one disclosed in U.S. Pat. No. 3,767,092, issued Oct. 23, 1973, to J. F. Garrison et al. To improve the garment gripping capabilities of garment clamping hangers, it is known to provide the jaws of such hangers with a coating of particles of high friction material, such as rubber, as is disclosed in U.S. Pat. No. 2,920,801, issued Jan. 12, 1960, to J. H. Batts. Hangers using high friction gripping pads have experienced several problems. Functionally, one of the major problems has been that of delamination of the pad from the hanger. This occurs along the bond line between the pad and hanger. This problem becomes acute when the hangers are used for heavy garments and even more so when the hanger is intended for repeated reuse or for transportation where it has to sustain the additional strain of repeated, abrupt, vertical movements often experienced in transit.

Another factor which has materially restricted their use is cost. Making the hanger in two separate operations, that is, first assembling or molding the hanger body and later bonding the garment gripping pads to the body involves labor costs which are not acceptable in the hanger manufacturing business. Another factor has been the problem of developing a pad which will provide the necessary grip and, at the same time, have sufficient body durability and strength to withstand the demands of commercial usage. Past experience had indicated that rubber pads, either natural or synthetic, which have the required frictional grip are not structurally capable of withstanding either repeated or rough usage. Heretofore, when the material had durability, it lacked the necessary frictional characteristics and vice versa.

A further problem has been effective adhesion to the hanger body. This is important because the bond line between the gripping pad and the hanger body must be capable of withstanding the loads imposed by the heavier garments. Along with this requirement, it is essential that the pad not damage or otherwise mark the garments. This is essential whether the hanger is intended for home or commercial use.

BRIEF DESCRIPTION OF THE INVENTION

Utilizing this invention, the hanger and the pads are molded in the same operation. The economy of being able to use a single molding operation is very important to the commercial acceptability of the resulting hanger.

The body of the hanger is injection molded by filling a mold. As soon as the plastic of the hanger body has set sufficiently to maintain its shape within the mold, cams are withdrawn to create cavities, one wall of which is formed by the plastic of the hanger body and the spaces thus created are filled with a different thermoplastic to form the pads. The normal molding cycle of both injected materials then follows until the materials have set sufficiently that the mold can be opened and the dual material hanger removed without deformation or distortion. In executing this dual molding technique, a very difficult problem had to be overcome, that being, controlling the migration of the pad forming material into the adjacent, already molded, but not yet fully set, body of the hanger. This problem is particularly acute in abutting areas of substantial differential in wall thickness of the hanger body. The invention provides a structure for controlling this problem.

DESCRIPTION OF THE PREFERRED EMBODIMENT

Figure 1:
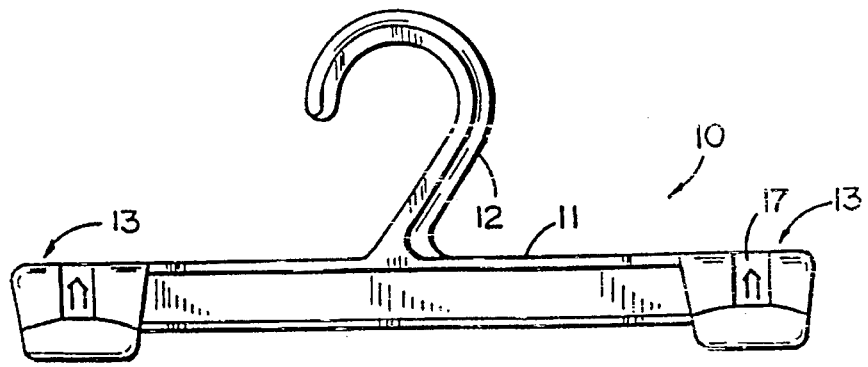
FIG. 1 is a front elevation view of a hanger incorporating this invention.

Referring to FIG. 1, conventional clamping hanger 10 of the type disclosed in U.S. Pat. No. 3,767,092, noted above, is illustrated. This hanger has an elongated beam-like body 11 supported at the center by an integral hook 12. At each end, the hanger has a garment clamp 13 formed by a pair of jaws 14 and 15 integrally joined by a thin section forming a hinge 16 about which the front jaw 14 can be pivoted. The rear jaw 15 is an integral extension of the hanger body 11 and with respect to the hanger body is stationary. The front jaw 14 is pivotable about the hinge 16. The jaws are resiliently urged into garment clamping position by a U-shaped spring latch 17 which is slidably mounted in a recessed channel. When the spring latch 17 is raised, the front jaw is released to be pivoted to open position. The body, the jaws and the hinges joining them are molded of a suitable plastic such as polypropylene as a single, unitary piece. All of the structure which has been described is well-known and is disclosed in the previously identified U.S. Pat. No. 3,767,092.

To provide means for positively gripping a garment, each jaw of each clamp is provided with a garment gripping pad 20. The pads 20 are provided adjacent the free end of each jaw and each pad extends substantially the full width of the jaw and approximately a third of its length or vertical height. The distance it extends up the length of the jaw is determined by a number of factors of which the shape of the jaw is an important one. The vertical length of the pad need not be more than that which will firmly engage and retain the garment under normal clamping pressure. The surface of the pad must project above the edges of the jaw both to assure a positive grip of the garment and to avoid creasing or otherwise marking the garment.

The functional characteristics of the pads 20 are very important. The garment engaging surfaces must have a very high coefficient of friction when firmly pressed against the fabric. However, the actual clamping pressure must be limited to avoid marking the garment. Further, this must be true for a wide range of fabrics, from cotton and wool to fabrics partially or totally of synthetic materials which have a very smooth or slick type of surface. It must also be able to grip these surfaces without either marking or adhering to the fabric other than solely by reason of friction. Because these hangers must be capable of use as shipping hangers, the material of the pads must be capable of maintaining its geometric integrity, a necessity for maintenance of its gripping ability, and must do so without thermally induced rigidity or softening, such as would materially adversely affect its ability to grip a garment. It must also not adhere to or become bonded to the garment once the clamping pressure is released. Thus, it must be able to withstand temperatures from below 0° F. (−17.7° C.) to about 150° F. (65.5° C.) without deterioration or development of any adverse functional characteristics, such as creep, adhesion or permanent distortion.

Another, and an important, necessary characteristic is its ability to maintain its garment gripping capability over an extended period of use and reuse. Heretofore, the resilient garment gripping pads have had an unacceptably short life. When the more compressible materials, such as sponge rubber, have been used, the pads rapidly become distorted and tear. Further, they lack the strength to withstand the weight of the heavier garments. It is also necessary that the pads be able to withstand the abrasion of certain fabrics. It is essential that the pads not mark the fabric, as a number of the materials used in certain rubbers to give them desired characteristics, such as wear resistance and strength, are known to do.

A further serious problem has been that of so bonding the pads to the hanger body that they will not delaminate or otherwise become detached from the hanger body even under severe operating conditions.

Figure 2:
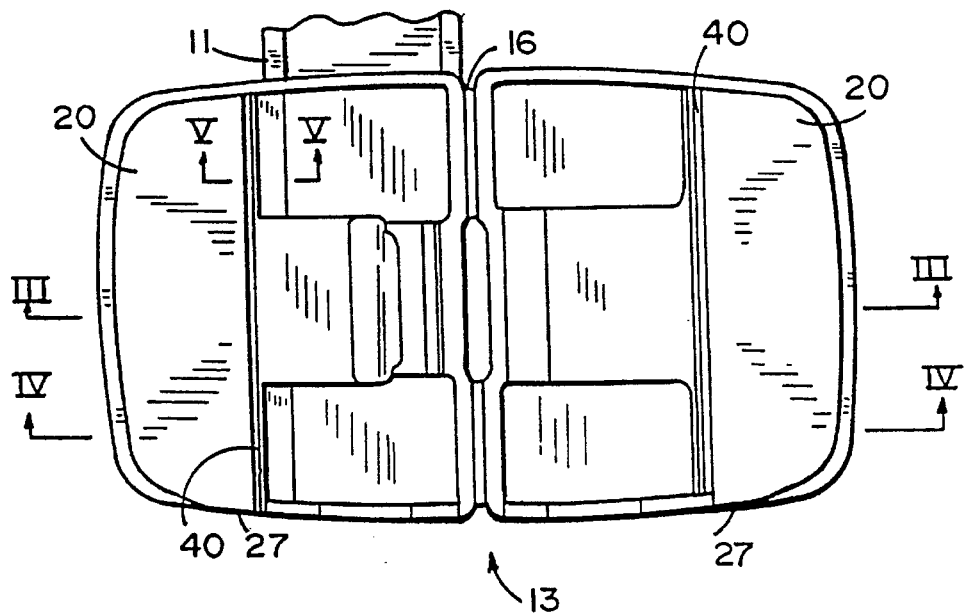
FIG. 2 is an enlarged view of the inside face of one of the clamps of the hanger illustrated in FIG. 1.
Figure 3:
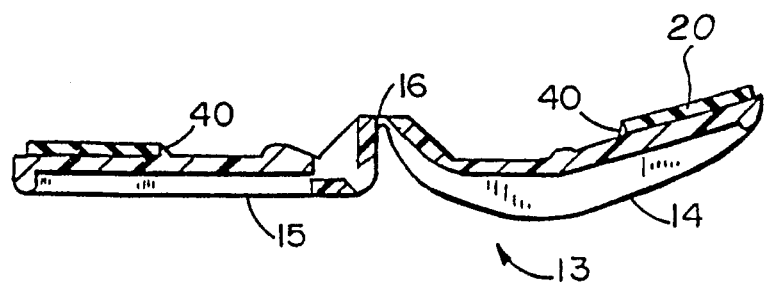
FIG. 3 is a central sectional view taken along the plane III—III of FIG. 2.
Figure 4:
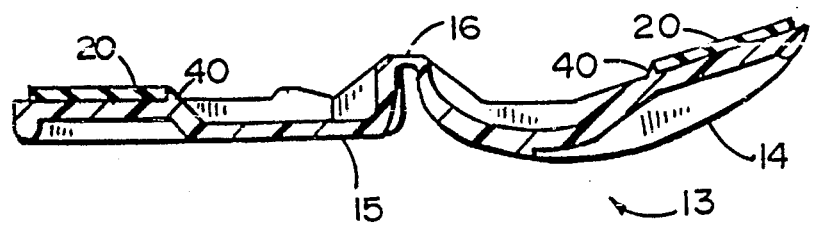
FIG. 4 is a sectional view taken along the plane IV—IV of FIG. 3.
Figure 6:
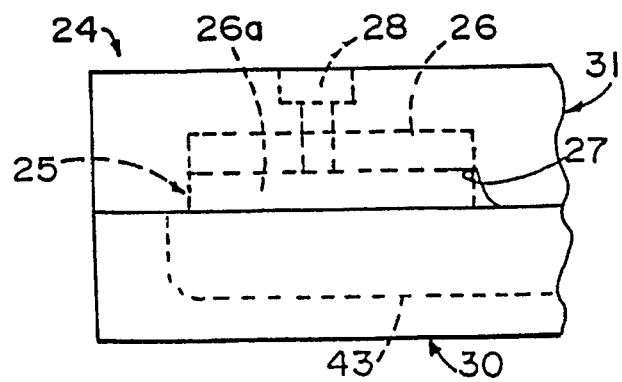
FIG. 6 is a fragmentary, side elevation view taken of a mold suitable for forming the hanger, illustrating in phantom a portion of the mold cavity.

To overcome all of these problems, the pads of this invention, instead of being a subsequently attached component of the hanger, are molded substantially simultaneously with the hanger so as to become an integral part of the hanger. To manufacture a hanger incorporating this invention, a two-piece mold 24, fragmentarily illustrated in FIG. 6, is provided having a cavity which simultaneously forms the entire hanger body including both clamps 13. If the hanger is designed with an integral hook, it also is formed by the mold. If a metal hook is used, it is assembled to the hanger body in a subsequent operation. The front and rear jaws 14 and 15 are molded in the fully open position as illustrated in FIGS. 2, 3 and 4. When the mold is initially closed, each cavity 25 in which a pad 20 is to be formed is occupied by a cam 26 (FIG. 6). Four of these cams are provided, one for each pad. With the cam occupying the cavity for the pad, the hanger forming resin, such as polypropylene, is injected into the mold to fill the entire mold except the spaces occupied by the cams. Within a few seconds following complete filling of the mold cavity, the resin has set sufficiently that the cams occupying the pad forming cavities are withdrawn, that is, upwardly into the space 26a, as illustrated in FIG. 6. Immediately, the resin to form the pads is injected into the space or pad cavities through the opening 27 which had been sealed by the presence of the cam 26. By what means 28 the cams 26 are moved is not relevant to this invention because equipment for accomplishing this is conventional. For example, it can be effected by timer controlled air cylinders or solenoids. Thereafter, the mold is held closed until both of the injected resins have set sufficiently that the molded hanger, with the pads, can be removed without distortion or loss of geometric integrity.

If the body of the hanger is molded of polypropylene, a suitable material for molding the pads includes certain thermoplastic rubbers, such as Kraton G-2706, manufactured by Shell Oil Company. The thermoplastic rubber Kraton G-7705 has also been found to provide both the desired surface characteristics and to effect an interlocking bond with the polypropylene. It is believed that the bond between the plastic of the hanger body and that of the pad may be formed by a molecularly interlocking polymer network. Whether or not this is correct, it is essential that the bond be substantially better than that normally formed between two quite different thermoplastic resins even when co-molded and different from that provided by known adhesives for joining such resins. This is necessary to eliminate the problem of separation of the pads from the hanger due to repeated usage and usage under severe conditions such as long distance transport. Both of the above polymers have a Shore hardness of about 28 which provides the pads with excellent fabric gripping characteristics and, at the same time, durability under conditions of repeated use with loads imposed parallel the pad surface.

If the hanger body is molded of styrene, then the pads should be molded from a D grade Kraton thermoplastic rubber, such as Kraton D 3226 or D 2109. The change in polymers is necessary to obtain the necessary anchorage between the pad and the hanger body.

It is essential to the functionality of the hanger of this invention that the anchor between the pad and the hanger body be strong and dependable. It is for this reason that the pads 20 are molded with the hanger body rather than molded separately and subsequently bonded to the hanger body. However, to avoid mixing of the resins, it is necessary that the molding of the hanger body and of the pads be sequential rather than simultaneous, yet remain sequential phases of a single molding cycle.

It was discovered that molding both in a single molding cycle created serious problems. It was found that the injection pressure required to positively fill the cavities for the pads was sufficient to cause the rubber for the pads to migrate out of the pad cavities into the mold cavity area where the hanger body had already been formed. This occurred, in part, as a result of shrinkage of the resin of which the hanger body had been molded. Although this shrinkage was slight, it was sufficient to allow creep of the resin of the pads because the subsequently injected resin entered under injection pressure while the previously injected resin of the hanger body was not only no longer subject to injection pressure, it was in some areas subject to a negative pressure resulting from cooling and setting. Further, this injection of the Kraton material has to be executed at a higher temperature than that necessary for the resin of the hanger body and, thus, at the boundary line between the two resins there can be and is some remelting of the resin from which the hanger body has been formed. This was found to permit unacceptable creep of the pad resin into the cavity areas which have to be exclusively occupied by the resin from which the hanger body had been formed.

In some cases, this creep or migration of the pad resin occurred between the hanger body and the mold. In other cases, especially in the case of thicker sections, the pad resin was able to force its way into the interior of the already molded shapes because the retained heat made these interior portions softer and more subject to remelting or deformation by the hot incoming material. Particularly, was this the case where an abrupt change in wall thickness of the molded body created an internal weakness to resin migration due to a change in thermal gradient. The problem proved to be particularly acute along the inside edge of the pads, that is, the edge facing the hinge line of the clamps.

It was realized from the start that this problem could be overcome by substantially extending the length of the molding cycle to allow additional cooling of the initially molded resin. This, however, was not considered an economically feasible solution due to the very substantial impact on production costs which would result. It also would have largely, if not entirely, eliminated the benefit of the bonding which was occurring between the hanger body and the pads. This would have had a substantial adverse affect upon utility and durability of the hangers. Therefore, it was considered essential not to increase either total molding cycle time or the lapse time between the two steps of the molding cycle. Consequently, an entirely different approach to the problem was necessary.

Figure 5:
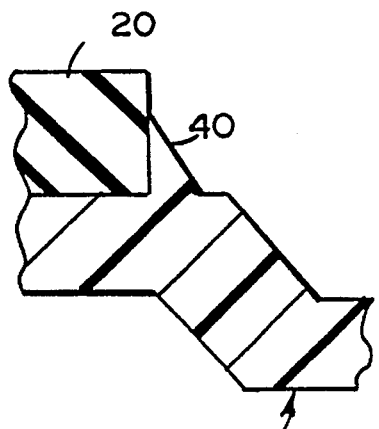
FIG. 5 is an enlarged, fragmentary sectional view taken along the plane V—V of FIG. 2.

After careful analysis and evaluation of the problem, it was decided to try to overcome the problem by providing a dam 40, extending transversely of each of the jaws. As is best seen in FIG. 5, the dams 40 are wedge-shaped. This provides a meeting point between the mold halves which proved to provide a positive cutoff against resin migration. The design of the dam is important to its ability to provide a solution to the migration problem. The dam is designed to be relatively thin in cross section. Therefore, it will set or solidify relatively quickly and, as a result, will become more resistant to migration of the pad resin at an earlier stage in the molding cycle. This is very important to avoiding the necessity for lengthening the molding cycle. The shape of the dam is such that its wall thickness decreases as it extends into the area in which the pad forming material is injected. The decreasing wall thickness facilitates thermal transfer and, thus, cooling in the areas most subject to heating from the pad forming resin. Where it has the greatest cross-sectional thickness, it is closest to the already cooled portion of both the mold and the previously injected resin. Thus, its design provides it with the ability to resist migration of the pad forming resin. Further, since it creates a thermally stable barrier at what previously was a possible space or area of weakness between the molded hanger body and the mold into which the pad material could migrate under high pressure, it effectively conquered the problem of secondary resin migration. It also proved to be effective against resin migration internally of the adjacent portions of the hanger body. This type of migration was not as aesthetically serious when opaque resins were used for the hanger body but it was totally unacceptable when the hanger body was molded of clear or translucent resins.

Figure 7:
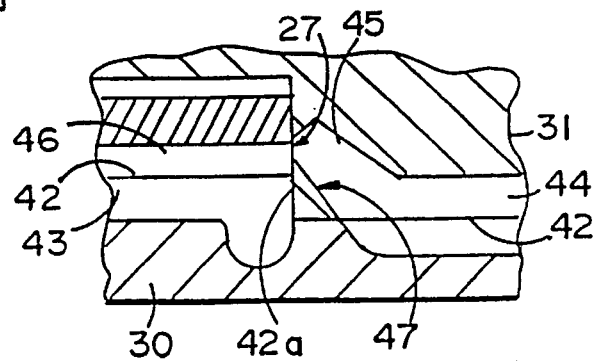
FIG. 7 is a fragmentary, sectional view of the resin injection gate for one of the pads molded with the hanger body.

The construction of one of the injection gates for the pad forming resin is illustrated in FIG. 7. A separate gate is provided for each pad. The mold half 30 forming the exterior surface of a clamp seats against the mold half 31 forming the clamp's inner surface along the parting line 42. At the exterior face of the clamp the parting line 42 has a portion 42a which follows this exterior face. The mold half 30 contains cavity 43 in which the clamp is molded. The cavity for forming the pad 20 is recessed into the mold half 31. The conduit 44 for the resin from which the pad is molded has a nozzle 45 which intersects the pad cavity 46 to provide a very small opening 27 (see also FIG. 6) into the pad forming cavity which is adjacent the face of the pad remote from the cavity forming the clamp. It will be noted that a wedge-shaped shear member 47 is provided between the parting line and the opening into the mold cavity. With this arrangement, on opening the mold, the mold half 30 is first withdrawn, downwardly, as illustrated, leaving the molded hanger in the mold half 31. The part is then ejected from the mold half 31 by ejection pins of conventional design. Ejection of the part from the mold half 31 causes the shear member 47 to shear the resin of the pad 20 at the opening 27 from the resin remaining in the conduit 44. Since the resin injection opening 27 is very small, on the order of 0.025 inch, the gate for the pad resin will not aesthetically adversely affect the finished hanger.

The invention has been illustrated as practiced with molds that part vertically with the hanger body formed in the lower half of the mold. It will be recognized that the mold halves could be inverted or the parting line of the molds could be arranged vertically without affecting the invention in any way.

The invention provides the first molded plastic garment clamping hanger having high friction garment gripping surfaces molded integrally with the hanger body to provide a hanger usable under the demanding requirements of manufacturing and commercial establishments.

Having described a preferred embodiment of this invention, it will be understood that modifications of this invention can be made. Such modifications are to be considered as included in the hereinafter appended claims unless the language thereof specifically excludes them.

I claim:

1. A garment hanger having an improved garment gripping means, said hanger comprising: a pair of jaws pivotally connected together by a hinge whereby they can be moved toward and away from each other for receiving and clamping a garment seated between them, the inwardly directed face of each of said jaws having a garment engaging pad, said pad being permanently bonded to an associated jaw by a non-rupturable permanent bond without adhesives at the boundary between each pad and its jaw, said bond will not permit separation of the pad from its jaw during repeated subsequent use even with heavy clothing, said pads each being a layer on a surface of its associated jaw and having a garment engaging surface having a high coefficient of friction and capable of garment engagement throughout its entire area facing toward the garment, each of said jaws also including an outwardly protruding dam member disposed along an upper edge of its pad and between the upper edge of its pad and its hinge, said dam precluding migration or displacement of the pad from the boundary zone during fabrication of the hanger.

2. A garment clamping hanger, said hanger comprising:

a body, garment clamping means carried by the body, and means for suspending said hanger, said garment clamping means including jaw means having first and second jaw members which are pivotally connected to one another by a hinge whereby they can be moved (i) toward each other for receiving and clamping a garment located between them, and (ii) away from one another, pad means carried by at least one jaw member between a lower end of said jaw member and the hinge pivotally connecting the two jaw members, said pad means being located in an opposed, garment contacting position with respect to the other jaw member, said pad means being permanently bonded to its associated jaw member by a non-rupturable, permanent, fused bond at a boundary zone of the pad means and that portion of its associated jaw member which it overlies, said jaw member also including a dam disposed along an upper edge of the boundary zone between said boundary zone and said hinge, said dam precluding migration or displacement of the pad from the boundary zone during fabrication of the hanger, said fused bend precluding separation of the pad means from its associated jaw member during repeated subsequent clamping cycles even with heavy clothing, said pad means including a layer of material having a garment contacting surface with a high co-efficient of friction.

3. The hangar of claim 2, wherein pad means are carried by both jaw members of the jaw means.

4. The hangar of claim 2, wherein two sets of jaw means are carried on opposite ends of the body.

* * * * *